US007287392B2

(12) United States Patent
Brand et al.

(10) Patent No.: US 7,287,392 B2
(45) Date of Patent: Oct. 30, 2007

(54) METHOD AND APPARATUS FOR OPERATING A WATER COOLER

(75) Inventors: Peter Brand, Louisville, KY (US); Jeffery Wayne Borden, Louisville, KY (US); Virginia Lee Castillo, Louisville, KY (US); John Joseph Roetker, Louisville, KY (US); Mark Anthony Copelli, New Albany, IN (US); William Stanley Garrett, Louisville, KY (US)

(73) Assignee: General Electric Company, Schenectady, NY (US)

( * ) Notice: Subject to any disclaimer, the term of this patent is extended or adjusted under 35 U.S.C. 154(b) by 548 days.

(21) Appl. No.: 10/970,078

(22) Filed: Oct. 21, 2004

(65) Prior Publication Data

US 2006/0086137 A1 Apr. 27, 2006

(51) Int. Cl.
*F25B 49/00* (2006.01)
*B67D 5/62* (2006.01)
*A01K 1/00* (2006.01)

(52) U.S. Cl. ........................ 62/132; 62/389; 236/91 E; 222/146.6

(58) Field of Classification Search .................. 62/132, 62/389, 338, 198, 199, 399–400; 236/91 E; 222/146.6
See application file for complete search history.

(56) References Cited

U.S. PATENT DOCUMENTS 3,735,604 A 5/1973 Asti
4,346,672 A 8/1982 Niki
4,915,793 A 4/1990 Chou
5,225,076 A 7/1993 Meredith
5,267,506 A 12/1993 Cai
5,833,096 A 11/1998 Ohu
6,076,706 A 6/2000 Kritchman
6,266,485 B1 7/2001 DeSantis et al.
6,659,048 B1 12/2003 DeSantis et al.
2004/0226313 A1* 11/2004 Busick ........................ 62/397

* cited by examiner

*Primary Examiner*—Chen Wen Jiang
(74) *Attorney, Agent, or Firm*—George L. Rideout, Esq.; Armstrong Teasdale LLP

(57) ABSTRACT

A method for operating a water cooler, wherein the water cooler includes a cooling system, a storage compartment assembly, a water dispenser assembly, and a climate control assembly including a thermostat and a control capillary, includes coupling the control capillary to the thermostat, and coupling the thermostat to the cooling system such that the thermostat controls the operational state of the cooling system. The method includes positioning the control capillary adjacent each of the storage compartment assembly and the water dispenser assembly, determining the temperature of the storage compartment assembly and the water dispenser assembly using the control capillary, and cooling the storage compartment assembly and the water dispenser assembly using the cooling system.

20 Claims, 4 Drawing Sheets

METHOD AND APPARATUS FOR OPERATING A WATER COOLER

BACKGROUND OF THE INVENTION

This invention relates generally to control systems for appliances, and more particularly, to a control system for a water cooler.

Known household appliances are available in various platforms having different structural features, operational features, and controls. For example, known water cooler platforms include side-by-side hot and cold liquid dispensers, and vertically oriented water bottles including a refrigeration unit and a water heater. Moreover, some known water coolers include a refrigerated storage compartment in addition to the refrigerated water dispenser.

Conventionally, a different control system, each including a cold thermostat, is used in each water cooler platform. For example, a storage compartment control system controls a temperature in the refrigerated compartment, and a water dispenser control system controls the cold water temperature in the water dispenser. In such water cooler platforms, the different control systems each control the operation of a compressor and a condenser. As such, when a demand for refrigeration is sensed by either control system, the refrigeration unit is activated and the storage compartment and/or the water dispenser is cooled. When the control systems are out of phase, one system can demand cooling shortly after the other system demand is satisfied, resulting in overload of the compressor. As such, some known water cooler platforms include a time delay relay to delay compressor operation until the compressor is capable of satisfying the demand of the control system. However, multiple control schemes and electrical connections not only increase assembly costs, but also present a possible defect in manufacturing or possibility of failure in use.

BRIEF DESCRIPTION OF THE INVENTION

In one aspect, a method is provided for operating a water cooler, wherein the water cooler includes a cooling system, a storage compartment assembly, a water dispenser assembly, and a climate control assembly including a thermostat and a control capillary. The method includes coupling the control capillary to the thermostat, and coupling the thermostat to the cooling system such that the thermostat controls the operational state of the cooling system. The method further includes positioning the control capillary adjacent each of the storage compartment assembly and the water dispenser assembly, determining the temperature of the storage compartment assembly and the water dispenser assembly using the control capillary, and cooling the storage compartment assembly and the water dispenser assembly using the cooling system.

In another aspect, a water cooler is provided including a cooling system, a storage compartment assembly configured to be cooled by the cooling system, and a water dispenser assembly configured to be cooled by the cooling system. The water cooler further includes a climate control assembly for operating the cooling system, wherein the climate control assembly includes a thermostat, and a control capillary coupled to the thermostat. The control capillary determines a temperature of the storage compartment assembly and the water dispenser assembly.

In yet another aspect, a climate control assembly is provided for a water cooler, wherein the water cooler includes a cooling system that cools at least two cooling units. The climate control assembly includes a thermostat for operating the cooling system, and a control capillary coupled to the thermostat, wherein the control capillary simultaneously determines a temperature of a first of the cooling units and a second of the cooling units.

DETAILED DESCRIPTION OF THE INVENTION

Figure 1:
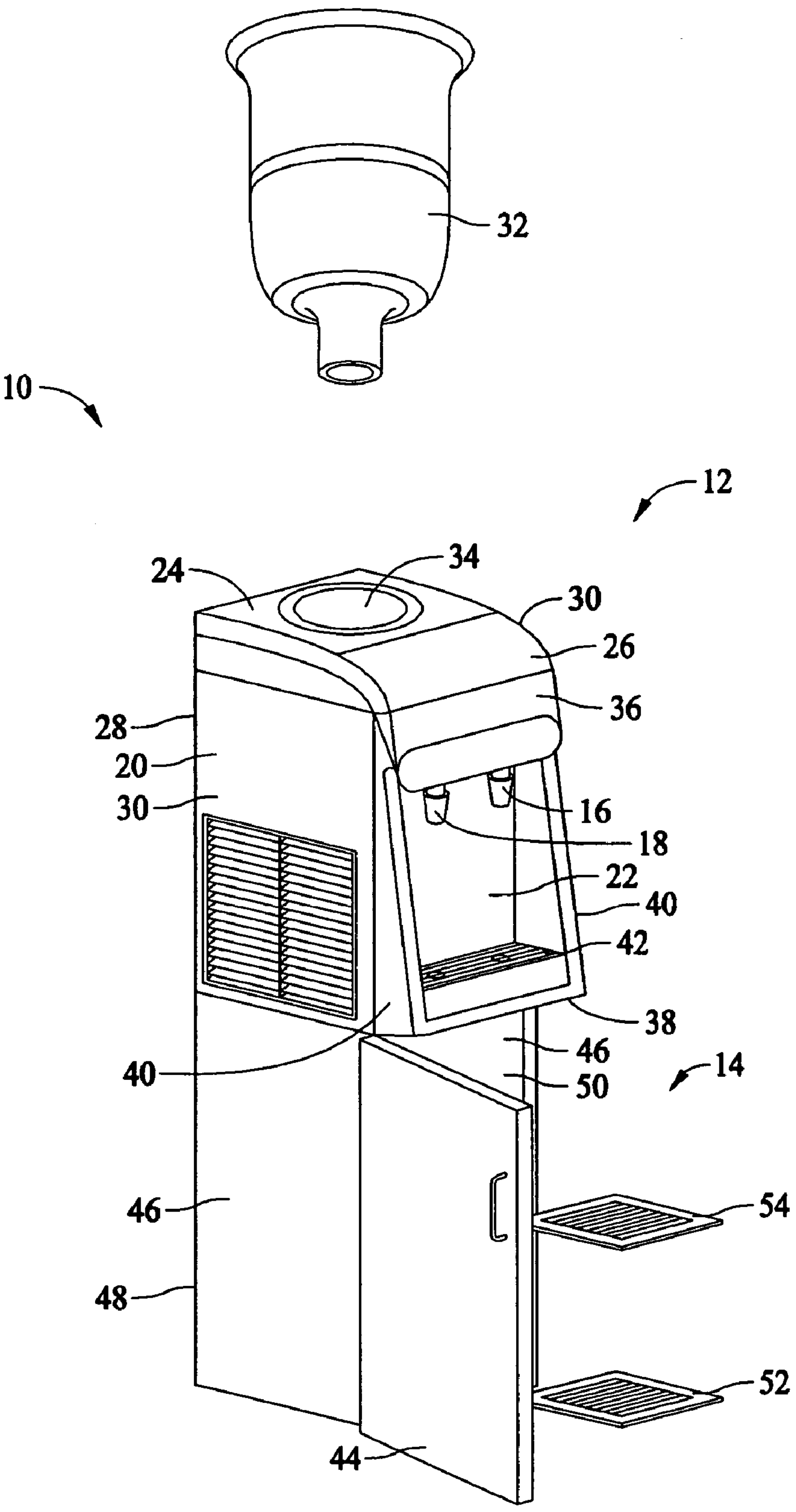
FIG. 1 is a perspective view of a water cooler.

FIG. 1 illustrates a water cooler 10 in which the present invention may be practiced. It is recognized, however, that the benefits of the present invention apply to other types of appliances utilizing a plurality of peripheral devices communicating with an electronic controller. Consequently, the description set forth herein is for illustrative purposes only and is not intended to limit the invention to practice with a particular appliance, such as water cooler 10.

While water cooler 10 could be utilized without any heating or cooling apparatus, commercial units typically include at least a cooling unit, both heating and cooling units, or heating, cooling and room temperature units. When two faucets are used, one dispensing cold water and another dispensing room temperature water, this is known as a “cool and cold” unit; if one faucet dispenses cold water and the other dispense hot water, this is known as a “hot and cold” unit. Water cooler 10 may be either a countertop model or floor model. When water cooler 10 is positioned on top of a refrigerated compartment, as illustrated in FIG. 1, this is known as a compartment-type bottled water cooler.

Water cooler 10 includes a water dispenser assembly 12 and a storage compartment assembly 14. In the exemplary embodiment, water dispenser assembly 12 is positioned above storage compartment assembly 14 and includes a cold water dispenser 16 and a hot water dispenser 18. Hot water dispenser 18 and cold water dispenser 16 are arranged side-by-side. A side-by-side hot and cold water cooler such as water cooler 10 is commercially available from General Electric Company, Appliance Park, Louisville, Ky. 40225. Alternatively, water cooler 10 is a cool and cold water cooler.

In the exemplary embodiment, water dispenser assembly 12 includes an external housing 20 and an alcove housing 22. External housing 20 includes a housing top 24, a front wall portion 26, a back wall portion 28, and a pair of side walls 30. Front wall 26 and side walls 30 form a space into which alcove housing 22 is inserted. To accommodate a liquid container 32, such as a bottle or other liquid containment device, housing top 24 has an opening 34 positioned therein.

Alcove housing 22 includes a front wall 36, a bottom wall 38, and a pair of side walls 40. A drip receptacle 42 rests on bottom wall 38. In the exemplary embodiment, hot water dispenser 18 and cold water dispenser 16 are positioned within alcove housing 22 generally directly above drip receptacle 42.

Storage compartment assembly 14 includes a door 44, a pair of side walls 46, and a back portion 48 that define a storage cavity 50. In one embodiment, storage compartment assembly 14 includes a compartment drip tray 52 and at least one compartment shelf 54. In the illustrated embodiment, storage compartment assembly 14 is refrigerated such that air contained within storage cavity 50 is cooled to a desired temperature. In another embodiment, storage compartment assembly 14 is non-refrigerated.

Figure 2:
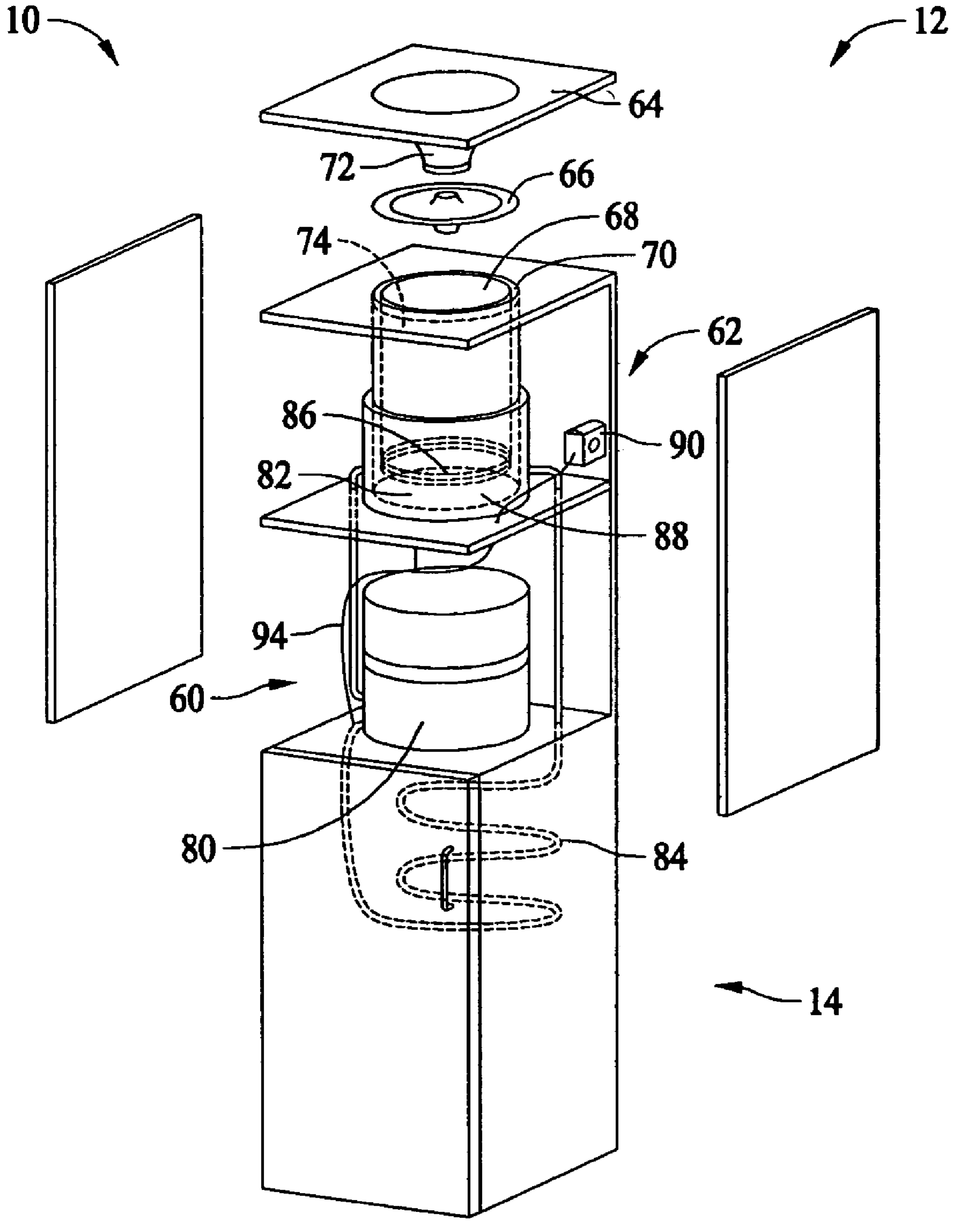
FIG. 2 is a cut away view of the water cooler shown in FIG. 1.

FIG. 2 is a cut away view of water cooler 10 including water dispenser assembly 12, storage compartment assembly 14, a cooling system 60, and a climate control assembly 62, or a thermostat. Cooling system 60 and climate control assembly 62 are positioned within water dispenser assembly external housing 20.

In the exemplary embodiment, water dispenser assembly 12 includes liquid container 32 (FIG. 1), a support collar 64, a separator 66, a reservoir 68, and an insulating shell 70. Support collar 64 is configured to receive liquid container 32. Support collar 64 includes a tapered or conical portion 72 which mates with separator 66. Separator 66 facilitates separating liquid container 32 and reservoir 68. As such, separator 66 is positioned between liquid container 32 and reservoir 68. Reservoir 68 is configured to receive liquid from liquid container 32. Insulating shell 70 defines a cavity 74 that covers the outside of reservoir 68 and facilitates limiting ambient temperature effects on the reservoir liquid. In the exemplary embodiment, insulating shell 70 is formed from a sufficiently rigid material suitable for facilitating the positioning of reservoir 68, while having sufficient insulating properties. In one embodiment, insulating shell 70 is formed from a polystyrene material. In an alternative embodiment, water dispenser assembly 12 receives a water supply from a water feed line (not shown), as opposed to liquid container 32.

In the exemplary embodiment, cooling system 60 includes a plurality of cooling or refrigeration components such as a compressor 80, a plurality of evaporator tubes 82, and an evaporator 84 connected in series with a return line (not shown) and charged with a refrigerant. In one embodiment, evaporator tubes 82 are coupled to evaporator 84. Cooling system 60 is coupled to water dispenser assembly 12 and storage compartment assembly 14. Specifically, a cooling pan 86 supports water dispenser assembly 12 and evaporator tubes 82 are coupled to cooling pan 86. Evaporator 84 is coupled to storage compartment assembly 14, and compressor 80 is positioned therebetween. In use, cooling system 60 includes an operational and a non-operational state. During the operational state, cooling system 60 facilitates cooling water dispenser assembly 12 and storage compartment assembly 14. Specifically, the refrigerant is channeled from compressor 80, through evaporator tubes 82 such that the refrigerant is channeled around reservoir 68, through evaporator 84 which is coupled to storage cavity 50, and back to compressor 80 where the refrigerant is recharged. As such, in the exemplary embodiment, cooling pan 86 is cooled prior to evaporator 84 being cooled. Accordingly, reservoir 68 is cooled prior to storage cavity 50.

In the exemplary embodiment, cooling pan 86 and/or reservoir 68 are fabricated from a thermally conductive material, and as such, cooling pan 86 and/or reservoir 68 facilitate cooling the liquid contained within reservoir 68. Specifically, evaporator tubes 82 are coupled in thermal communication with reservoir 68 such that, when cooling system 60 is in the operational state, the temperature of the refrigerant in evaporator tubes 82 is transferred to reservoir 68 and/or the liquid in reservoir 68. In the exemplary embodiment, cooling pan 86 is located within insulating shell cavity 74 adjacent a bottom end 88 of reservoir 68. Additionally, evaporator 84 is fabricated from a thermally conductive material, and as such, evaporator 84 facilitates cooling storage cavity 50. In one embodiment, evaporator 84 is an extension of evaporator tubes 82.

Cooling system 60 is controlled by climate control assembly 62. In the exemplary embodiment, climate control assembly 62 includes a thermostat 90 and a control capillary 94 that includes a gas configured to expand and contract in accordance with the ambient temperature. As such, when the temperature increases, the pressure in control capillary 94 also increases, and when the temperature decreases, the pressure in control capillary 94 also decreases. In the exemplary embodiment, thermostat 90 is positioned within water dispenser assemblies 12. In an alternative embodiment, thermostat 90 is positioned within storage compartment assembly 14. In the exemplary embodiment, control capillary 94 is coupled to evaporator 84, and is not coupled to reservoir 68. As such, control capillary 94 determines a temperature of the coolant at the downstream end of cooling system 60. Accordingly, cooling system 60 operates until both reservoir 68 and storage cavity 50 are cooled to the predetermined temperature. In an alternative embodiment, control capillary 94 is positioned adjacent reservoir 68 and storage compartment assembly sidewall and/or back portion 46 and/or 48 such that control capillary 94 determines a temperature of each of reservoir 68 and storage cavity 50. As such, control capillary determines an average temperature of water dispenser and storage compartment assemblies 12 and 14.

In the exemplary embodiment, thermostat 90 is coupled to control capillary 94, and as such, is configured to sense the pressure in control capillary 94, thereby determining the corresponding temperature of water dispenser and storage compartment assemblies 12 and 14. Additionally, thermostat 90 is coupled to cooling system 60, and as such, communicates when cooling is demanded of cooling system 60.

In use, a user selects a temperature setting on thermostat 90 that corresponds to the desired temperature for the liquid in water dispenser assembly 12 and for the air in storage compartment assembly 14. In one embodiment, the desired temperature for water dispenser assembly 12 is different than the desired temperature for storage compartment assembly 14. In an alternative embodiment, the desired temperature for water dispenser assembly 12 is substantially equal to the desired temperature for storage compartment assembly 14. When the temperature is above a specified amount that correlates with the temperature setting of thermostat 90, thermostat 90 facilitates signaling cooling system 60 to change from a non-operational state to an operational state, thereby cooling water dispenser assembly 12 and/or storage compartment assembly 14.

Figure 3:
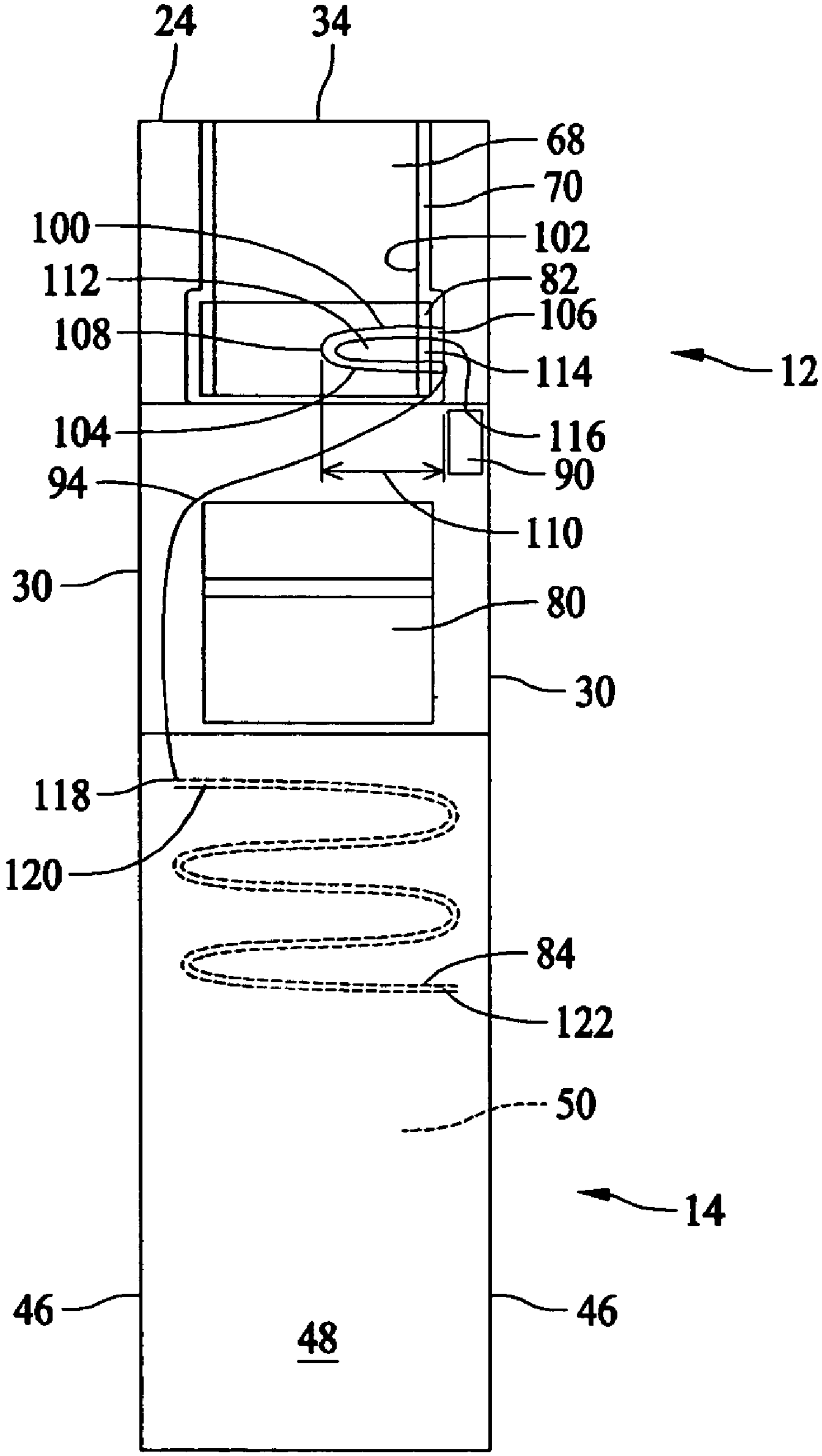
FIG. 3 is a schematic illustration of a climate control assembly in accordance with one embodiment of the present invention.

FIG. 3 illustrates an exemplary embodiment of cooling system 60 and climate control assembly 62. Cooling system 60 includes compressor 80, evaporator tubes 82, and evaporator 84 coupled together in series by a plurality of refrigerant lines (not shown). Climate control assembly 62 includes thermostat 90 and control capillary 94. Additionally, reservoir 68 includes a sensing tube 100 coupled to an inner side wall 102 of reservoir 68 and extending into an interior of reservoir 68. Sensing tube 100 is fabricated from a thermally conductive material, such as, but not limited to, a copper material. Sensing tube 100 includes a body 104 extending between a first end 106 and a second end 108 for a length 110. Body 104 defines a tube cavity 112. First end 106 includes an opening 114 that is open to the exterior of reservoir 68.

In the exemplary embodiment, control capillary 94 extends between a first end 116 and a second end 118. First end 116 is coupled to thermostat 90 that is positioned within external housing 20. In one embodiment, a portion of control capillary 94 extends into sensing tube 100. Specifically, the portion is positioned within tube cavity 112 and is coupled to tube body 104 such that thermal transfer exists between tube body 104 and control capillary 94. In one embodiment, control capillary 94 is doubled over such that control capillary 94 extends into opening towards tube second end 108 and then extends from tube second end 108 through opening 114. Tube length 110 is variably selected to facilitate thermal transfer between tube 100 and control capillary 94. In an alternative embodiment, tube 100 extends across reservoir 68 and is open to the exterior of reservoir 68 on first and second ends 106 and 108. In one embodiment, tube 100 is positioned proximate reservoir bottom end 88. In an alternative embodiment, tube 100 is positioned remote with respect to reservoir bottom end 88.

In the exemplary embodiment, control capillary second end 118 is coupled to evaporator 84. Specifically, second end 118 is coupled to evaporator 84 proximate to a downstream end 120 of evaporator 84, where refrigerant is channeled through evaporator 84 from an upstream end 122 to downstream end 120. As such, control capillary 94 facilitates determining a temperature of the refrigerant at the downstream most end of cooling system 60. Accordingly, cooling system 60 operates at the operational state until both water dispenser assembly 12 and storage compartment assembly 14 are cooled to the desired temperatures. In one embodiment, control capillary 94 bypasses sensing tube 100 and second end 118 is coupled directly to downstream end 120 of evaporator 84.

Figure 4:
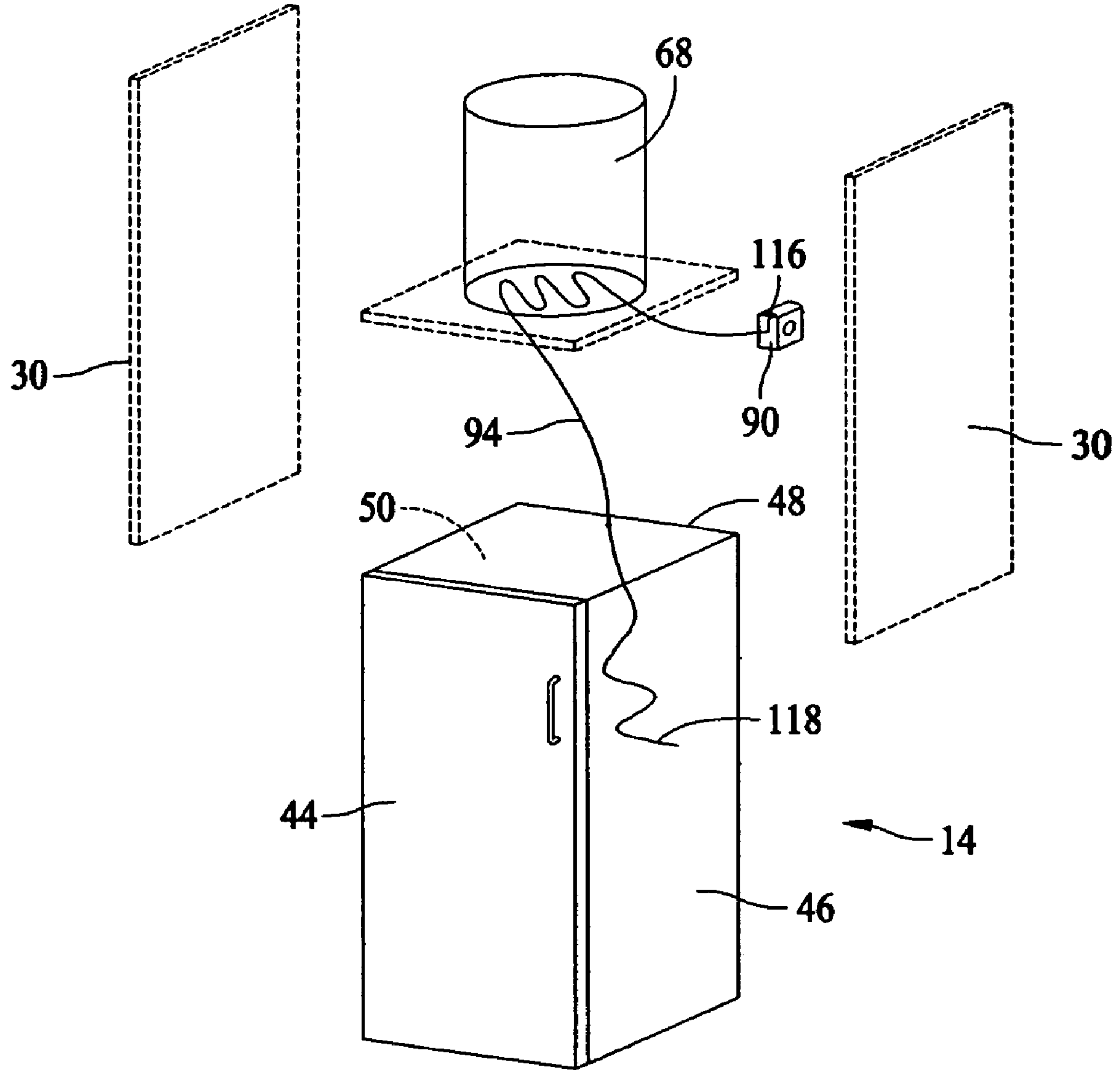
FIG. 4 is a schematic illustration of a climate control assembly in accordance with another embodiment of the present invention.

FIG. 4 illustrates another exemplary embodiment of climate control assembly 62. In the exemplary embodiment, control capillary first end 116 is coupled to thermostat 90 that is positioned within external housing 20. Control capillary 94 extends from thermostat 90 to reservoir 68. In the exemplary embodiment, control capillary 94 is coupled to the exterior of bottom end 88 of reservoir 68 for a length. Specifically, the control capillary 94 is in a multiple S configuration to provide additional length along bottom end 88 such that the length is sufficient to facilitate thermal transfer between control capillary 94 and bottom end 88. In an alternative embodiment, control capillary 94 has a different configuration, such as, but not limited to, a circular configuration or a straight line configuration across bottom end 88. In another alternative embodiment, control capillary 94 extends along an interior of reservoir 68 in contact with the liquid stored within reservoir 68.

Additionally, second end 118 of control capillary 94 extends from reservoir 68 into storage cavity 50. In one embodiment, control capillary 94 is surrounded by an insulating cover (not shown) wherever control capillary 94 is not in thermal contact with reservoir 68 and/or storage cavity 50. In the exemplary embodiment, control capillary 94 is coupled within storage cavity 50 to side wall 46 for a length. The length is variably selected to facilitate thermal transfer between control capillary 94 and the air within storage compartment assembly 14. In one embodiment, control capillary 94 is coupled to side wall 46 in an S configuration to provide additional length along side wall 46. In another embodiment, control capillary 94 is coupled along back portion 48. As such, control capillary 94 facilitates determining a temperature of both water dispenser and storage compartment assemblies 12 and 14. Accordingly, if either assembly 12 and/or 14 has a rise in temperature enough to cause climate control assembly 62 to signal a demand to cooling system 60, cooling system 60 changes to the operational state and cools both assemblies. Accordingly, cooling system 60 operates at the operational state until both water dispenser assembly 12 and storage compartment assembly 14 are cooled to the desired temperatures.

The above described embodiments provide a cost effective and reliable means for operating a water cooler. Specifically, a climate control assembly including a single cold control and a single control capillary functions to monitor the temperature associated with a water dispenser assembly and a storage compartment assembly. As such, when the climate control assembly determines that either or both assemblies have a demand for refrigerant, the cold control assembly signals a cooling system to change to an operational state. Accordingly, the climate control assembly reduces the overall water cooler cost and assembly time.

Exemplary embodiments of a water cooler are described above in detail. The water cooler is not limited to the specific embodiments described herein, but rather, components of each water cooler may be utilized independently and separately from other components described herein. For example, each water cooler component can also be used in combination with other water cooler components.

While the invention has been described in terms of various specific embodiments, those skilled in the art will recognize that the invention can be practiced with modification within the spirit and scope of the claims.

What is claimed is:

1. A method for operating a water cooler, wherein the water cooler comprises a cooling system, a storage compartment assembly, a water dispenser assembly, and a climate control assembly including a thermostat and a control capillary, said method comprising:

coupling the control capillary to the thermostat;

coupling the thermostat to the cooling system such that the thermostat controls the operational state of the cooling system;

positioning the control capillary adjacent at least one of the storage compartment assembly and the water dispenser assembly;

determining the temperature of the storage compartment assembly and the water dispenser assembly using the control capillary; and cooling the storage compartment assembly and the water dispenser assembly using the cooling system.

2. A method in accordance with claim 1 wherein said determining the temperature comprises simultaneously determining the temperature of each of the storage compartment assembly and the water dispenser assembly using the control capillary.

3. A method in accordance with claim 1 wherein said positioning the control capillary comprises coupling a portion of the control capillary to the storage compartment assembly, and coupling a portion of the control capillary to the water dispenser assembly.

4. A method in accordance with claim 3 wherein the water dispenser assembly includes an interior wall and an exterior wall, the water dispenser assembly is configured to store a liquid for cooling, the climate control assembly includes a sensing tube coupled to the interior wall of the water dispenser assembly and extending within the water dispenser assembly such that the sensing tube contacts the liquid stored within the water dispenser assembly, said coupling a portion of the control capillary to the water dispenser assembly comprises positioning the control capillary within the sensing tube for a length such that the control capillary is configured to determine a temperature of the liquid.

5. A method in accordance with claim 1 wherein the cooling system includes an evaporator thermally coupled in series to the water dispenser assembly and the storage compartment assembly, said positioning the control capillary comprises coupling the control capillary to a downstream end of the evaporator such that the temperature determined by the control capillary relates to the warmest temperature in the cooling system.

6. A water cooler comprising:

a cooling system;

a storage compartment assembly configured to be cooled by said cooling system;

a water dispenser assembly configured to be cooled by said cooling system; and a climate control assembly for operating said cooling system, said climate control assembly comprising a thermostat, and a control capillary coupled to said thermostat, said control capillary for determining a temperature of said storage compartment assembly and said water dispenser assembly.

7. A water cooler in accordance with claim 6 wherein said cooling system comprises at least one evaporator for cooling each of said storage compartment assembly and said water dispenser assembly, a portion of said control capillary coupled to said evaporator.

8. A water cooler in accordance with claim 7 wherein said water dispenser assembly further comprises a sensing tube coupled to an interior wall of said reservoir and extending within said reservoir such that said sensing tube contacts the liquid stored within said reservoir, said control capillary extends within said sensing tube for a length.

9. A water cooler in accordance with claim 6 wherein a portion of said control capillary coupled to said storage compartment assembly, a portion of said control capillary coupled to said water dispenser assembly.

10. A water cooler in accordance with claim 9 wherein said control capillary is filled with a gas that expands and contracts as an ambient temperature changes.

11. A water cooler in accordance with claim 9 wherein the water dispenser assembly comprises a liquid container configured to supply liquid to said liquid dispenser, a reservoir configured to store the liquid supplied by said liquid container, an evaporator coupled to said cooling system and configured to cool the liquid stored in said reservoir, wherein said portion of said control capillary coupled to said water dispenser assembly is coupled to said reservoir such that said control capillary is configured to determine a temperature of the liquid stored in said reservoir.

12. A water cooler in accordance with claim 11 wherein said control capillary is coupled to said reservoir such that said portion of said control capillary is coupled to a bottom of said reservoir for a length.

13. A water cooler in accordance with claim 11 wherein said water dispenser assembly further comprises an insulating shell extending at least partially around at least one of said reservoir and said evaporator, said control capillary coupled between said insulating shell and said at least one of said reservoir and said evaporator.

14. A water cooler in accordance with claim 11 wherein said storage compartment assembly comprises at least one sidewall and a door defining a storage cavity, said portion of said control capillary coupled to said storage compartment assembly is coupled to one of said at least one sidewalls for a length such that said control capillary is configured to determine a temperature of said storage cavity.

15. A water cooler in accordance with claim 11 wherein said storage compartment assembly comprises at least one sidewall and a door defining a storage cavity, said portion of said control capillary coupled to said storage compartment assembly extends at least partially into said storage cavity for a length such that said control capillary is configured to determine a temperature of said storage cavity.

16. A climate control assembly for a water cooler, the water cooler including a cooling system that cools at least two cooling units, said climate control assembly comprising:

a thermostat for operating the cooling system; and a control capillary coupled to said thermostat, said control capillary for simultaneously determining a temperature of a first of the cooling units and a second of the cooling units.

17. A climate control assembly in accordance with claim 16 wherein the cooling system includes an evaporator for cooling the cooling units, a portion of said control capillary configured to be coupled to the evaporator.

18. A climate control assembly in accordance with claim 16 wherein said control capillary comprises a length, a portion of said control capillary configured to be coupled to the first cooling unit, a portion of said control capillary configured to be coupled to the second cooling unit.

19. A climate control assembly in accordance with claim 18 wherein said first cooling unit is configured to store a liquid for cooling, said control capillary is coupled directly to the first cooling unit for a length such that said control capillary is configured to determine a temperature of the liquid.

20. A climate control assembly in accordance with claim 18 wherein the second cooling unit includes at least one sidewall and a door defining a storage cavity, said portion of said control capillary coupled to the second cooling unit is coupled to one of the at least one sidewalls for a length such that said control capillary is configured to determine a temperature of the storage cavity.

* * * * *